United States Patent
Chong et al.

(10) Patent No.: US 10,190,412 B2
(45) Date of Patent: Jan. 29, 2019

(54) DETERMINING SUBTERRANEAN-FORMATION RESISTIVITY USING AN ELECTROMAGNETIC TELEMETRY SYSTEM

(71) Applicant: HALLIBURTON ENERGY SERVICES, INC., Houston, TX (US)

(72) Inventors: Matthew Hui Chong, Spring, TX (US); Yijing Fan, Singapore (SG); Glenn Andrew Wilson, Singapore (SG); Paul Andrew Cooper, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/536,392

(22) PCT Filed: May 11, 2016

(86) PCT No.: PCT/US2016/031806
§ 371 (c)(1),
(2) Date: Jun. 15, 2017

(87) PCT Pub. No.: WO2017/196313
PCT Pub. Date: Nov. 16, 2017

(65) Prior Publication Data
US 2018/0195381 A1 Jul. 12, 2018

(51) Int. Cl.
*G01V 3/00* (2006.01)
*E21B 49/00* (2006.01)
(Continued)

(52) U.S. Cl.
CPC ............ *E21B 49/00* (2013.01); *E21B 47/121* (2013.01); *E21B 47/122* (2013.01); *G01V 3/24* (2013.01);
(Continued)

(58) Field of Classification Search
CPC ........................................................ G01V 3/34
See application file for complete search history.

(56) References Cited

U.S. PATENT DOCUMENTS

| | | | |
|---|---|---|---|
| 5,168,942 A | | 12/1992 | Wydrinski et al. |
| 5,883,516 A | * | 3/1999 | Van Steenwyk ...... E21B 47/122 |
| | | | 175/50 |

(Continued)

FOREIGN PATENT DOCUMENTS

| | | |
|---|---|---|
| WO | 8807212 | 9/1988 |
| WO | 2015023270 | 2/2015 |

OTHER PUBLICATIONS

Bonner, et al., "A New Generation of Electrode Resistivity Measurements for Formation Evaluation While Drilling", SPWLA 35th Annual Logging Symposium, 1994.
(Continued)

*Primary Examiner* — Clayton E. LaBalle
*Assistant Examiner* — Jas A Sanghera
(74) *Attorney, Agent, or Firm* — Kilpatrick Townsend & Stockton LLP

(57) ABSTRACT

An electromagnetic telemetry system can be used for determining a resistivity of a portion of a wellbore drilled through a subterranean formation. For example, the electromagnetic telemetry system can include a computing device and a downhole transceiver positioned on a well tool in the wellbore. The computing device can receive, from the downhole transceiver, a signal indicating a load impedance across an electrically insulating segment of the downhole transceiver. The computing device can determine a resistivity associated with a portion of the wellbore based on the load impedance. The computing device can determine a corrected resistivity by modifying the resistivity associated with the portion of the wellbore using a correction factor.

15 Claims, 6 Drawing Sheets

(51) Int. Cl.
*E21B 47/12* (2012.01)
*G01V 3/24* (2006.01)
*G01V 3/34* (2006.01)
*G01V 3/38* (2006.01)
*G01V 3/26* (2006.01)

(52) U.S. Cl.
CPC .............. *G01V 3/26* (2013.01); *G01V 3/34* (2013.01); *G01V 3/38* (2013.01)

(56) References Cited

U.S. PATENT DOCUMENTS

| | | |
|---|---|---|
| 6,188,222 B1 | 2/2001 | Tabanou et al. |
| 6,369,575 B1 | 4/2002 | Eisenmann et al. |
| 6,788,066 B2 | 9/2004 | Wisler et al. |
| 6,850,068 B2 | 2/2005 | Chemali et al. |
| 7,095,233 B1 | 8/2006 | Tabanou et al. |
| 7,141,981 B2 | 11/2006 | Folberth et al. |
| 7,256,582 B2 | 8/2007 | Gorek et al. |
| 7,394,258 B2 | 7/2008 | Itskovich et al. |
| 7,679,368 B2 | 3/2010 | Folberth et al. |
| 7,782,060 B2 | 8/2010 | Clark et al. |
| 7,861,801 B2 | 1/2011 | Alberty et al. |
| 7,888,941 B2 | 2/2011 | San Martin et al. |
| 8,174,266 B2 | 5/2012 | Gold et al. |
| 8,957,683 B2 | 2/2015 | Bittar et al. |
| 8,965,704 B2 | 2/2015 | Tabarovsky et al. |
| 2009/0066334 A1* | 3/2009 | Peter ............... E21B 47/02224 324/333 |
| 2010/0039115 A1* | 2/2010 | Bespalov ............... G01V 3/20 324/355 |
| 2014/0184229 A1 | 7/2014 | Bloemenkamp et al. |
| 2015/0101867 A1 | 4/2015 | Clark et al. |

OTHER PUBLICATIONS

International Patent Application No. PCT/US2016/031806, International Search Report and Written Opinion, dated Jan. 6, 2017, 17 pages.

\* cited by examiner

DETERMINING SUBTERRANEAN-FORMATION RESISTIVITY USING AN ELECTROMAGNETIC TELEMETRY SYSTEM

CROSS-REFERENCE TO RELATED APPLICATION

This is a U.S. national phase under 35 U.S.C. 371 of International Patent Application No. PCT/US2016/031806, titled "Determining Subterranean-Formation Resistivity Using an Electromagnetic Telemetry System" and filed May 11, 2016, the entirety of which is incorporated herein by reference.

TECHNICAL FIELD

The present disclosure relates generally to devices for use in well systems. More specifically, but not by way of limitation, this disclosure relates to determining subterranean-formation resistivity using an electromagnetic telemetry system.

BACKGROUND

A wellbore can be drilled through a subterranean formation for extracting hydrocarbons (e.g., oil or gas) from the subterranean formation. It can be desirable to determine various characteristics of the wellbore prior to, or concurrent with, drilling the wellbore. For example, a well operator can use the determined characteristics to make judgments about the wellbore, to detect the existence of any potential hazards, or to perform other functions.

DETAILED DESCRIPTION

Figure 1:
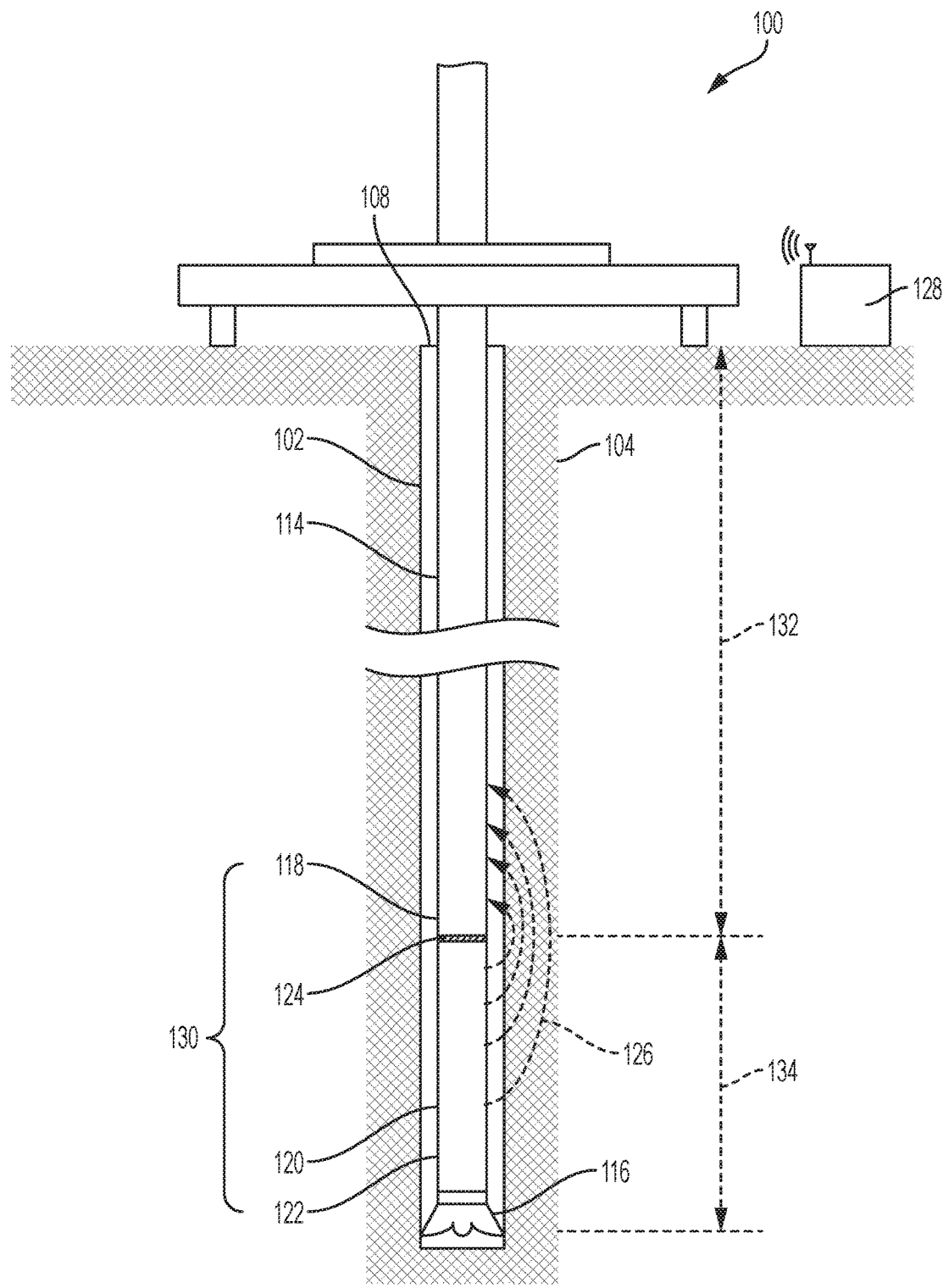
FIG. 1 is a cross-sectional view of an example of a well system for determining subterranean-formation resistivity using an electromagnetic telemetry system according to some aspects.

Certain aspects and features of the present disclosure are directed to determining a resistivity of a subterranean formation using an electromagnetic telemetry system. The electromagnetic telemetry system can include a computing device positioned at a surface of a wellbore formed through the subterranean formation. The electromagnetic telemetry system can also include a downhole transceiver positioned on a well tool (e.g., a drill string) in the wellbore. The computing device can receive, from the downhole transceiver, a signal indicating a load impedance across an electrically insulating segment of the downhole transceiver. The computing device can determine a resistivity associated with a portion of the subterranean formation based on the load impedance. The computing device can determine a corrected resistivity associated with the portion of the subterranean formation by modifying the resistivity using a correction factor. In some examples, the correction factor can be used to account for a presence of a fluid in the wellbore, a type of the fluid in the wellbore, a volume of the fluid in the wellbore, or any combination of these on the determined resistivity.

In some examples, the computing device can determine the correction factor using a database. For example, the computing can use the database to map a particular type of fluid in the wellbore, such as oil or water, to a particular correction factor.

In some examples, the computing device can determine the resistivity associated with the portion of the subterranean formation by first determining a conductivity associated with the portion of the subterranean formation. The computing device can determine the conductivity based on a longitudinal length of at least a portion of the well tool, a skin depth of the subterranean formation, an outer diameter of the electrically insulating segment, a frequency at which the downhole transceiver operates, a magnetic permeability of the subterranean formation (e.g., including a casing or liner associated with the subterranean formation), a relative permeability of the subterranean formation, or any combination of these. Because resistivity can be the inverse of conductivity, the computing device can then determine the resistivity by inversing the determined conductivity.

In some examples, using an electromagnetic telemetry system to determine a resistivity of a subterranean formation can be faster, cheaper, and more practical than other methods. For example, if the downhole transceiver is already part of a well tool positioned in a wellbore, then some examples may not require any additional hardware or well tools to determine the resistivity of the subterranean formation. This is unlike traditional methods of determining a resistivity of a subterranean formation, in which a separate resistivity tool is used to determine the resistivity, which can require significant time and expense. Further, some examples can provide improved accuracy by correcting for a temperature in the wellbore, a presence of a fluid in the wellbore, a type of the fluid in the wellbore, a volume of the fluid in the wellbore, or any combination of these.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 for determining subterranean-formation resistivity using an electromagnetic telemetry system according to some aspects. The well system 100 includes a wellbore 102 extending through various earth strata. For example, the wellbore 102 can extend through a hydrocarbon-bearing subterranean formation 104. The wellbore 102 can be vertical, deviated, horizontal, or any combination of these.

The wellbore 102 can be cased, open-hole, or a combination of these. For example, a casing string can extend from a well surface 108 to the subterranean formation 104. The casing string may provide a conduit through which formation fluids, such as production fluids produced from the subterranean formation 104, can travel from the wellbore 102 to the well surface 108. In some examples, the casing string can be coupled to the walls of the wellbore 102 via cement. For example, a cement sheath can be positioned or formed between the casing string and the walls of the wellbore 102 for coupling the casing string to the wellbore 102.

The well system 100 can include a computing device 128. The computing device 128 can be positioned belowground (e.g., within a well tool 114), aboveground, onsite, in a vehicle, offsite, etc. In some examples, the computing device 128 can include a processor interfaced with other hardware via a bus. A memory, which can include any suitable tangible (and non-transitory) computer-readable medium, such as RAM, ROM, EEPROM, or the like, can embody program components that configure operation of the computing device 128. In some aspects, the computing devices 128 can include input/output interface components (e.g., a display, printer, keyboard, touch-sensitive surface, and mouse) and additional storage. An example of the computing device 128 is further described with respect to FIG. 5.

The well system 100 can include at least one well tool 114. In some examples, the well tool 114 can include a drilling tool, such as a measuring-while-drilling (MWD) tool. In such an example, the well tool 114 can include a drill bit 116 for drilling at least a portion of the wellbore 102. The well tool 114 can additionally or alternatively include various subsystems, such as a logging-while-drilling (LWD) module, a measuring-while-drilling (MWD) module, a rotary steerable system, a motor, or any combination of these. The drill bit 116 and one or more subsystems can be incorporated into a bottom hole assembly (BHA) of the well tool 114. In other examples, the well tool 114 can be coupled to a wireline, slickline, or coiled tubing for positioning the well tool 114 in the wellbore 102. The well tool 114 can be conveyed into the wellbore 102 by manipulating the wireline, slickline, or coiled tube using, for example, a guide or winch.

The well tool 114 includes an upper section 118 and a lower section 120. The upper section 118 and the lower section 120 can each include a respective electrically conductive housing. For example, an outer housing 122 of the lower section 120 can include a metal material or another electrically conductive material. In some examples, the electrically conductive housing of the upper section 118 can be an upper antenna and the electrically conductive housing of the lower section 120 can be a lower antenna, which together can form a dipole antenna. In some examples, an electrically insulating segment 124 (sometimes referred to as a "gap") can electrically separate the upper section 118 from the lower section 120 of the well tool 114. The electrically insulating segment 124 can include rubber, plastic, or another insulative (e.g., high resistivity) material.

The upper section 118, the lower section 120, and the electrically insulating segment 124 can form at least a portion of an electromagnetic telemetry system. For example, the upper section 118, lower section 120, and electrically insulating segment 124 can form a downhole transceiver 130 of the electromagnetic telemetry system. The electromagnetic telemetry system can be usable for communicating information between the well tool 114 and the well surface 108, or between the well tool 114 and another well tool.

In some examples, the downhole transceiver 130 can transmit data by applying a modulated electrical signal (e.g., via electronics that may be internal to the well tool 114) across the electrically conductive housings of the upper section 118 and the lower section 120. The data can be encoded in the modulated electrical signal. In some examples, the modulated electrical signal can include a frequency of 2-15 Hz. Application of the modulated electrical signal across the upper section 118 and the lower section 120 of the well tool 114 can produce one or more electromagnetic signals 126 that can propagate through the subterranean formation 104. In some examples, the electromagnetic signals 126 can propagate to the well surface 108. A sensor coupled to the computing device 128 can detect the electromagnetic signals 126 at the well surface 108 and transform the electromagnetic signals 126 into electrical signals. The sensor can transmit the electrical signals to the computing device 128. The computing device 128 can receive the electrical signals and determine the data based on the electrical signals, for example, by demodulating the electrical signals.

A propagation path of the electromagnetic signals 126 through the wellbore 102 can be defined by the upper section 118 of the well tool, the subterranean formation 104, one or more casings in the wellbore, or any combination of these. In some examples, one or more propagation characteristics of the electromagnetic signals 126 can be modelled according to coaxial-cable principles. For example, the well tool 114 can represent an inner cable of a coaxial cable, because the well tool 114 can have a high conductivity. The subterranean formation 104 can represent an outer cable of the coaxial cable. Using a similar theory as is used for determining a characteristic impedance of a coaxial cable, a load impedance across the electrically insulating segment 124 can be determined according to the following equation:

$$Z_l = \int_0^{L_a} \frac{1}{2\pi\sigma(x)}\left(-\ln\frac{D}{2\delta(x)}\right)dx \qquad \text{(Equation 1)}$$

where $Z_l$ can be the load impedance, $L_a$ can be a longitudinal length of the lower section 120 (e.g., between the electrically insulating segment 124 and the drill bit 116), σ can be a conductivity of a portion of the subterranean formation 104 around the lower section 120, δ can be a skin depth of the subterranean formation 104, and D can be an outer diameter of the electrically insulating segment 124. In some examples, the values for $L_a$ and D can be known. For example, a well operator can measure the longitudinal length of the lower section 120 and an outer diameter of the electrically insulating segment 124 prior to positioning the well tool 114 in the wellbore 102. Additionally, the electromagnetic telemetry system can be configured determine a value for $Z_l$ (e.g., prior to communicating data). Further, a value for δ can be determined according to the following equation:

$$\delta = \sqrt{\frac{2\rho}{(2\pi f)(\mu_0\mu_r)}} \qquad \text{(Equation 2)}$$

where ρ can be 1/σ, f can be a frequency at which the electromagnetic telemetry system operates, $\mu_0$ can be a constant value (e.g., $\mu_0$ can represent a magnetic permeability of the subterranean formation 104, which can be extremely low or negligible), and $\mu_r$ can be a constant value (e.g., $\mu_r$ can represent a relative permeability of the subterranean formation 104, which can be extremely low or negligible). In some examples, f, $\mu_0$, and $\mu_r$ can be known or predetermined values. For example, the electromagnetic telemetry system can be preprogrammed to operate using a particular frequency (f), and therefore the value for f may be known. As another example, the magnetic permeability ($\mu_r$) and the relative permeability ($\mu_0$) of the subterranean formation 104 can be determined based on subterranean-formation samples, a material (e.g., rock type) from which the subterranean-formation is formed, or both. Thus, in some examples, the only unknown variable in Equations 1 and 2 can be the conductivity (a) of the portion of the subterranean formation 104 around the lower section 120 of the well tool 114. In such examples, Equations 1 and 2 can be combined and rearranged and solved for a.

Although Equations 1 and 2 were used above to determine a conductivity (σ) using the load impedance ($Z_l$), some examples can use additional or alternative methods to determine the conductivity using the load impedance. In some examples, the conductivity can be determined using a voltage, current, power, or any combination of these derived from the load impedance. For example, using Ohm's law, a ratio of voltage-to-current associated with the load impedance can be determined. The conductivity can then be determined based on the ratio of voltage-to-current. In other examples, a modelling engine can be used to determine the conductivity using the load impedance. For example, an inversion method with a numerical electromagnetic forward-modeling algorithm (e.g., using a finite element method, finite difference method, integration method, or any combination of these) can be used to inverse the conductivity of the subterranean formation 104 from the load impedance. The numerical electromagnetic forward-modeling algorithm can be used to model the full domain electromagnetic-field distribution based on, for example, a known structure of the well tool 114 and a pre-assumed conductivity of the subterranean formation 104. The numerical electromagnetic forward-modeling algorithm can be used in conjunction with an inversion algorithm (e.g., a Guass-Newton algorithm) and applied to the load impedance to determine the conductivity.

In some examples, the determined conductivity (a) can encompass both a conductivity of the portion of the subterranean formation 104 around the lower section 120 of the well tool 114, and a conductivity for the subterranean formation 104 at or near the drill bit 116. For example, if a longitudinal length from the electrically insulating segment 124 to the drill bit 116 is short (e.g., 31 meters), the determined conductivity can at least partially represent the conductivity of the subterranean formation 104 at or near the drill bit 116.

Figure 2:
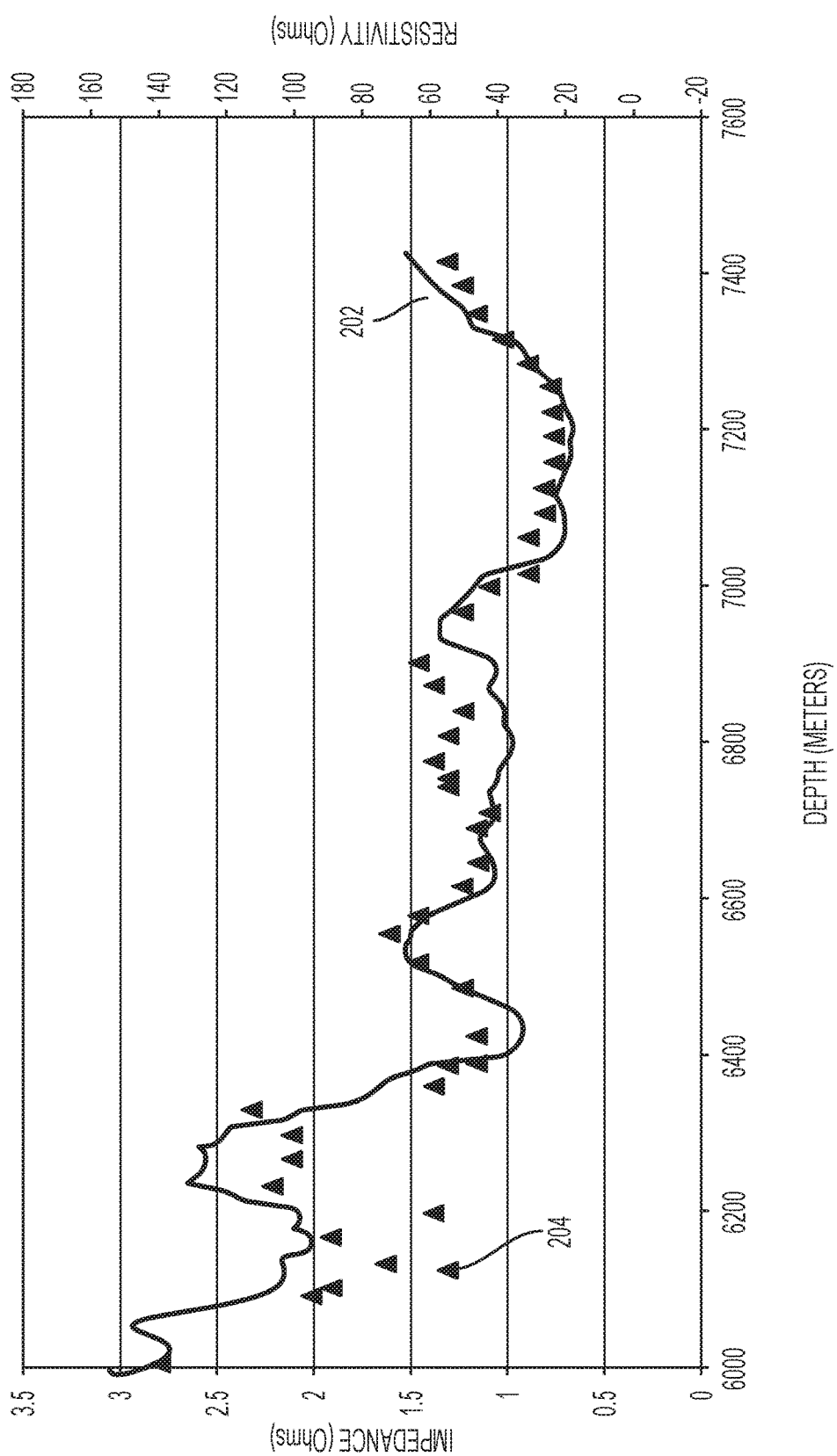
FIG. 2 is a graph showing resistivity values obtained using a resistivity tool against load impedance values determined using an electromagnetic telemetry system according to some aspects.

In some examples, it can be desirable to determine a resistivity of the subterranean formation 104. For example, it can be desirable to determine the resistivity of the subterranean formation 104 at or near the drill bit 116. Because resistivity can be the inverse of conductivity, in some examples, the resistivity of the subterranean formation 104 can be determined by inversing the determined conductivity (σ). In other examples, a change in a load impedance ($Z_l$) can itself be used to approximate a change in a resistivity of the subterranean formation 104. For example, referring to FIG. 2, line 202 can depict resistivity values at different depths in a wellbore obtained using a resistivity tool (e.g., a separate well tool for detecting a resistivity downhole). Points 204 can depict load impedance values at the different depths in the wellbore obtained from the electromagnetic telemetry system. As shown, the load impedance values depicted by points 204 track the resistivity values depicted by line 202. The similarity between points 204 and line 202 can indicate a correlation between the load impedance values and the resistivity values. Thus, changes in load impedance can be used to approximate changes in the resistivity of the subterranean formation 104.

Figure 3:
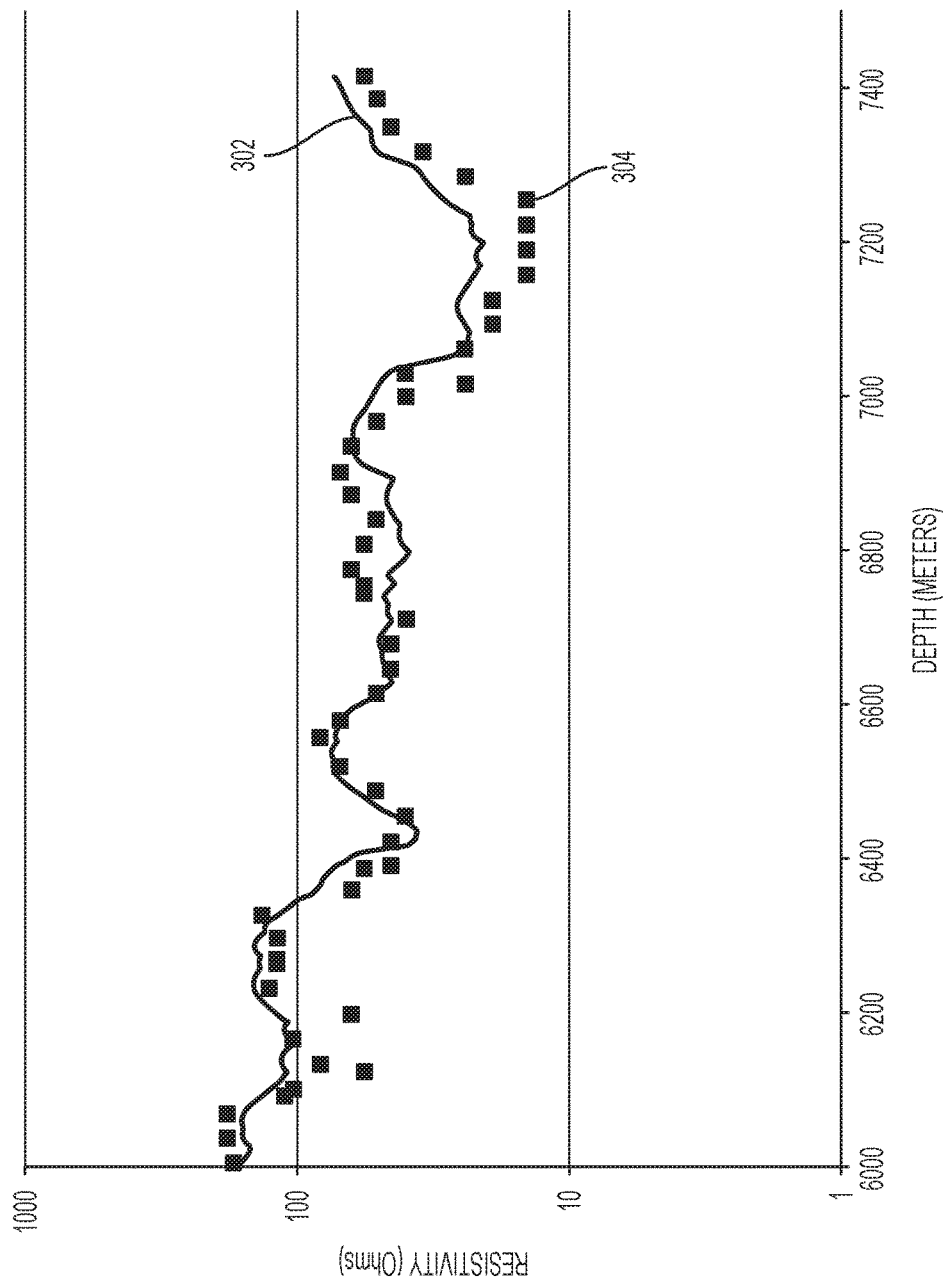
FIG. 3 is a graph showing resistivity values obtained using a resistivity tool against resistivity values determined using an electromagnetic telemetry system according to some aspects.

In some examples, it can be desirable to correct a determined resistivity value based on one or more features of a wellbore (e.g., wellbore 102 of FIG. 1), a well tool (e.g., well tool 114 of FIG. 1), or both. For example, the presence of a fluid, such as mud, surrounding at least a portion of a lower section of a well tool can affect the determined resistivity value. Correcting for the effect of the fluid on the resistivity value can improve the accuracy of the resistivity value. For example, referring to FIG. 3, line 302 can depict resistivity values at different depths in a wellbore obtained using a resistivity tool. Points 304 can depict resistivity values at the different depths in the wellbore obtained using methods described above, and further corrected for a resistivity of mud in the wellbore. As shown, the resistivity values depicted by points 304 closely align with the resistivity values depicted by line 302. The similarity between points 304 and line 302 can indicate that the corrected resistivity values are accurate.

In some examples, it can be desirable to correct a determined resistivity value based on one or more additional or alternative features of the wellbore, well tool, or both. For example, a type of a fluid surrounding at least a portion of a lower section of a well tool can affect the determined resistivity value. For instance, because water-based mud can have different electrical properties than oil-based mud, water-based mud can affect the determined resistivity value differently than oil-based mud. Correcting for an effect of the type of the fluid on the resistivity value can improve the accuracy of the resistivity value. In some examples, a volume of a fluid surrounding at least a portion of the lower section of the well tool (e.g., near drill bit 116 of FIG. 1) can affect the determined resistivity value. Correcting for the volume of the fluid surrounding the lower section of the well tool can improve the accuracy of the resistivity value. In some examples, a temperature (e.g., of a fluid in the wellbore or of an environment in the wellbore) can affect the determined resistivity value. Correcting for the temperature can improve the accuracy of the resistivity value. Any number and combination of corrections can be performed to improve the accuracy of the resistivity value. In some examples, correcting a determined resistivity value can include adding (or subtracting) a constant value to (or from) the determined resistivity value, a determined load impedance value (e.g., $Z_l$), a determined conductivity value (e.g., a), or any combination of these.

Returning to FIG. 1, in some examples, the computing device 128 can determine a resistivity at or near the drill bit 116 using any of the methods described above. For example, the computing device 128 can be preprogrammed with Equation 1, Equation 2, values for $L_a$, D, f, $\mu_0$, $\mu_r$ or any combination of these. Additionally, the computing device 128 can receive, via a wired or wireless interface, data indicative of a value for $Z_l$ from the downhole transceiver 130. The computing device 128 can use the Equation(s) and values to determine a conductivity of a portion of the subterranean formation 104 at or near the drill bit 116. The computing device 128 can determine an inverse of the conductivity to determine the resistivity at or near the drill bit 116. In some examples, the computing device 128 can use one or more algorithms, databases, or both to determine one or more correction factors to use to correct for various features of the wellbore 102, the well tool 114, or both. For example, the computing device 128 can determine (e.g., from a sensor downhole) that a fluid surrounding at least a portion of the drill bit 116 is an oil-based mud. The computing device 128 can use a lookup table or database to map the oil-based mud to a particular correction factor. The computing device 128 can apply the correction factor to the determined resistivity to generate a corrected resistivity value. The computing device 128 can use the corrected resistivity value as the determined resistivity.

In some examples, more accurate determinations of resistivity can be obtained if a longitudinal length 132 of the well tool (e.g., from the electrically insulating segment 124 to the well surface 108) positioned in the wellbore 102 is substantially larger than another longitudinal length 134 of the well tool (e.g., from the electrically insulating segment 124 to the drill bit 116) positioned in the wellbore 102. For example, a resistivity determined by the computing device 128 can be more accurate if the longitudinal length 132 is 304.4 meters and the longitudinal length 134 is 9.1 meters. If longitudinal length 132 is not significantly larger than longitudinal length 134, the upper section 118 of the well tool 114 can effect a load impedance across the electrically insulating segment 124, which may negatively impact resistivity determinations.

Figure 4:
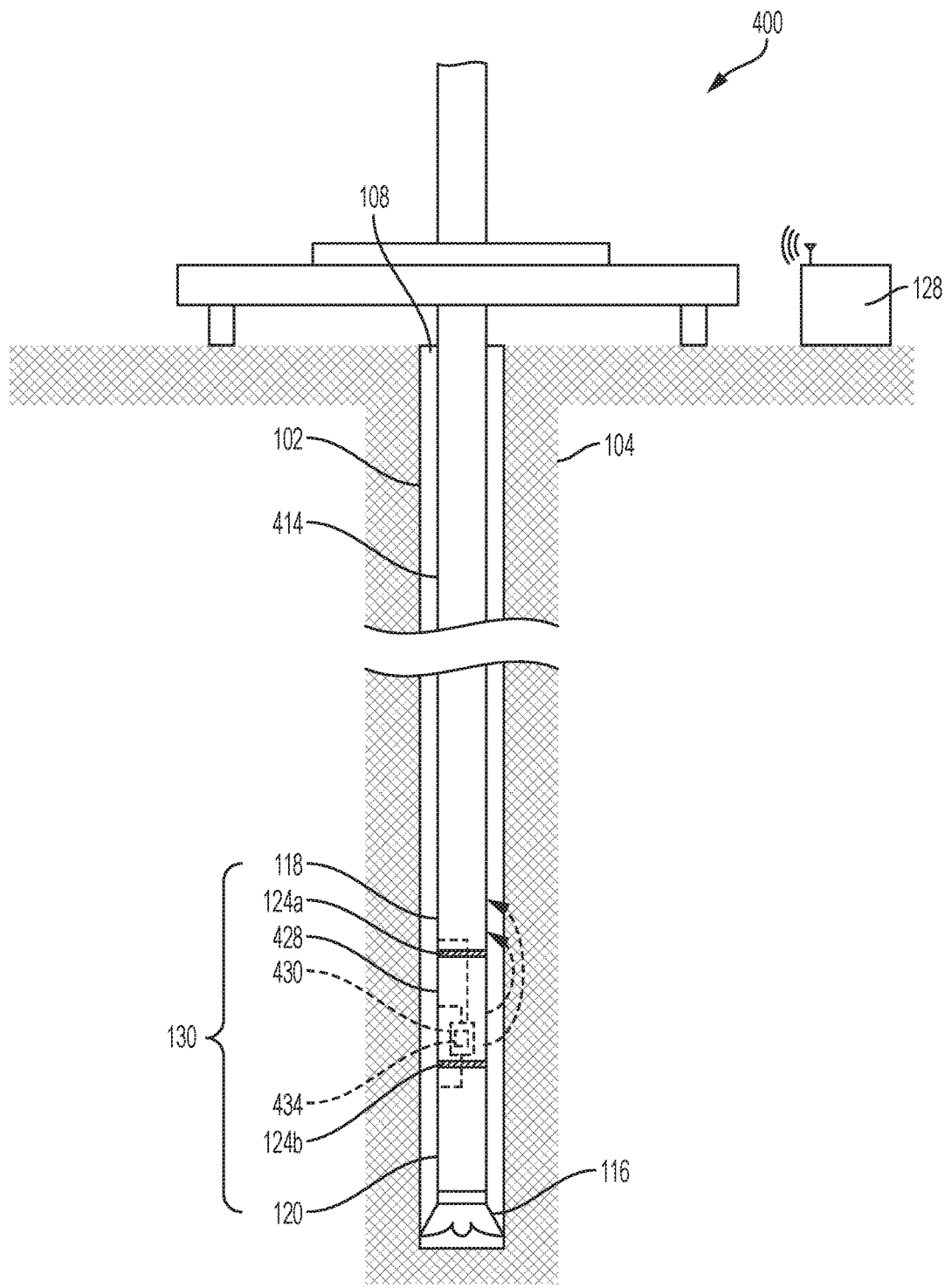
FIG. 4 is a cross-sectional view of another example of a well system that includes a system for determining subterranean-formation resistivity using an electromagnetic telemetry system according to some aspects.

FIG. 4 is a cross-sectional view of another example of a well system 400 that includes a system for determining subterranean-formation resistivity using an electromagnetic telemetry system according to some aspects. Similar to the well system 100 of FIG. 1, the well system 400 includes a wellbore 102 drilled through a subterranean formation 104. A well tool 414 can be positioned in the wellbore 102 and extend to the well surface 108. The well tool 414 can include a downhole transceiver 130 that can be at least a portion of an electromagnetic telemetry system. The well system 400 can also include a computing device 128 (e.g., positioned at the well surface 108) for receiving electromagnetic signals 126 from the downhole transceiver 530.

In the example shown in FIG. 4, the well tool 414 includes an upper section 118, an intermediary section 428, and a lower section 120. The intermediary section 428 can include an electrically conductive housing. For example, a housing of the intermediary section 428 can include a metal material. In some examples, an electrically insulating segment 124$a$ can electrically separate the upper section 118 from the intermediary section 428 of the well tool 414. Another electrically insulating segment 124$b$ can electrically separate the intermediary section 428 from the lower section 120 of the well tool 114.

The well tool 414 can include electronics 430. The electronics 430 can control the operation of the downhole transceiver 130 in response to signals (e.g., commands) from the computing device 128. For example, the computing device 128 can transmit a signal to the electronics 430, which can include a switch 434 (e.g., a relay). In response to the signal from the computing device 128, the electronics 430 can toggle the switch 434 to a closed position. When in the closed position, the switch 434 can electrically couple the intermediary section 428 to the lower section 120. This can cause the intermediary section 428 and the lower section 120 to form a substantially continuous electrically conductive housing. In such a configuration, the downhole transceiver 130 can operate substantially as described above with respect to FIG. 1. For example, the upper section 118 can be an upper antenna, and a combination of the intermediary section 428 and the lower section 120 can form a lower antenna, which can be combined with the upper antenna to form a dipole antenna. The electronics 430 can operate the dipole antenna to transmit electromagnetic signals to the computing device 128. For example, the electronics 430 can operate the dipole antenna to transmit a load impedance ($Z_l$) of the downhole transceiver 130 to the computing device 128. In such an example, the load impedance of the downhole transceiver 130 can include a load impedance across the electrically insulating segment 124$a$ ($Z_{layer\ 124a}$) plus another load impedance across the electrically insulating segment 124$b$ ($Z_{layer\ 124b}$) which can be represented as:

$$Z_l = Z_{layer\ 124a} + Z_{layer\ 124b} \qquad \text{(Equation 3)}$$

The computing device 128 can detect the electromagnetic signals and, for example, determine a resistivity of the subterranean formation 104 at or near the drill bit 116 based on the load impedance of the downhole transceiver 130.

In some examples, the computing device 128 can transmit another signal to the electronics 430. In response to the signal from the computing device 128, the electronics 430 can toggle the switch 434 to an open position. When in the open position, the switch 434 can electrically disconnect the intermediary section 428 from the lower section 120. In such a configuration, as shown in FIG. 4, the upper section 118 can be an upper antenna and the intermediary section 428 can be a lower antenna, which together can form the dipole antenna. The electronics 430 can operate the dipole antenna to transmit electromagnetic signals to the computing device 128. In such an example, the load impedance ($Z_l$) determined by the downhole transceiver can be a load impedance across the electrically insulating segment 124$a$. The load impedance can be associated with a resistivity of the subterranean formation 104 at or near the intermediary section 428, rather than at or near the drill bit 116. The computing device 128 can detect the electromagnetic signals and, for example, determine a resistivity of the subterranean formation 104 at or near the intermediary section 428 based on the load impedance. In some examples, by causing the switch 434 to toggle between open and closed positions, the computing device 128 can receive information associated with different portions of the subterranean formation 104 and determine resistivities of the different portions of the subterranean formation 104. This may provide a more granular level of resistivity information to a well operator.

The well tool 414 can include any number of electrically conductive sections (e.g., sections 118, 428, 120), with an electrically insulating segment 124$a$-$b$ positioned between each pair of electrically conductive sections. The electronics 430 can be coupled to each of the electrically conductive sections and include any number of switches 434 for electrically connecting and disconnecting various combinations of the electrically conductive sections. This can allow the downhole transceiver 130 to be used to determine resistivities associated with any number and combination of portions of the subterranean formation 104. In this manner, a larger amount of more granular resistivity information can be provided to a well operator.

Figure 5:
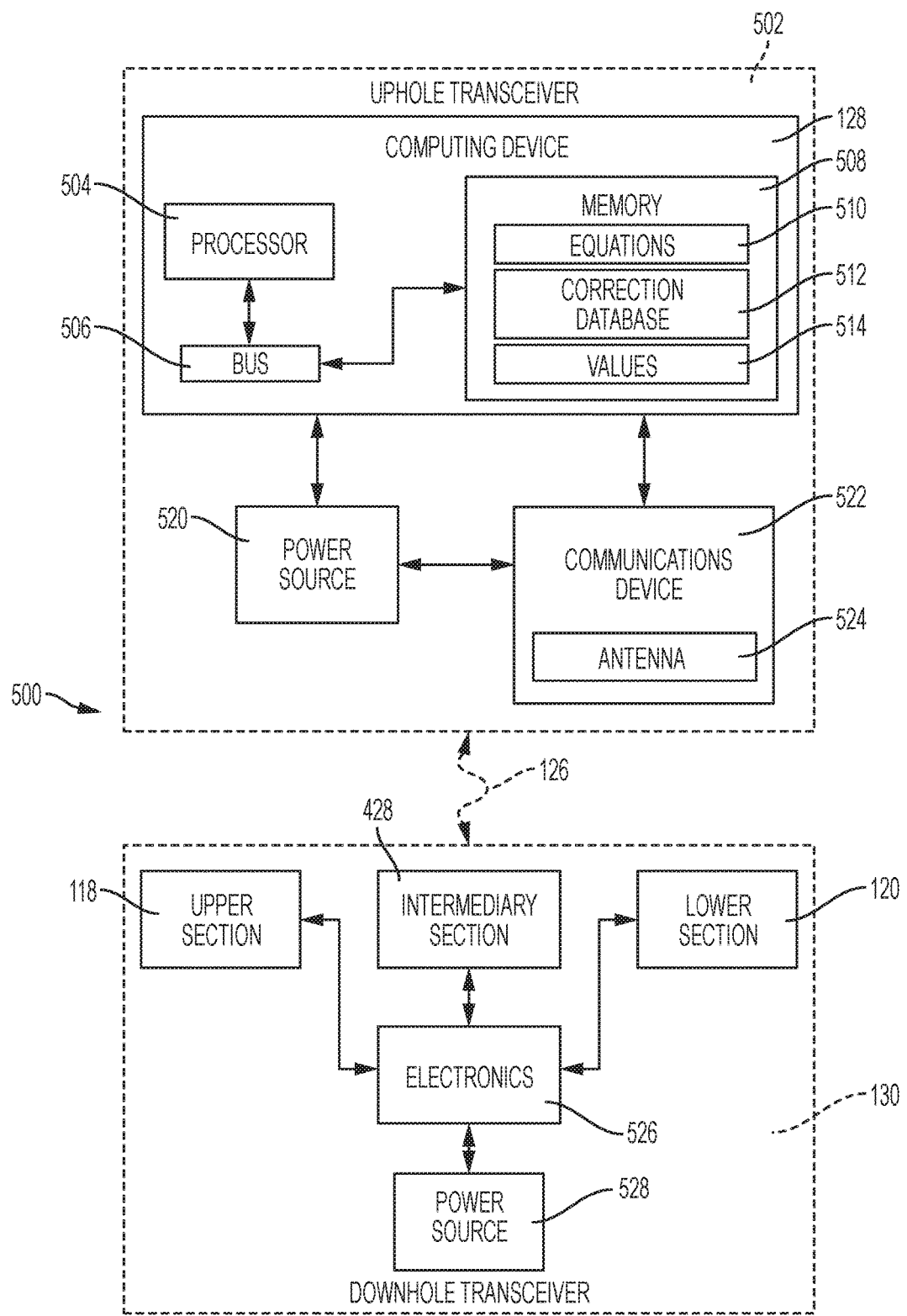
FIG. 5 is a block diagram of an example of a system usable for determining subterranean-formation resistivity according to some aspects.

FIG. 5 is a block diagram of an example of a system 500 (e.g., an electromagnetic telemetry system) usable for determining subterranean-formation resistivity. The system 500 includes a downhole transceiver 130 and an uphole transceiver 502.

The downhole transceiver 130 includes an upper section 118 of a well tool and a lower section 120 of a well tool. In some examples, the downhole transceiver 130 also includes an intermediary section 428 of the well tool. In some examples, the downhole transceiver 130 can include a power source 528, such as an AC signal generator. The power source 528 can transmit a modulated electrical signal to the upper section 118, the intermediary section 428, the lower section 120, or any combination of these to generate an electromagnetic signal 126. For example, the power source 528 can apply a modulated voltage across the upper section 118 and the lower section 120 to generate an electromagnetic signal 126. As another example, the power source 528 can apply a modulated voltage across the upper section 118 and the intermediary section 428 to generate an electromagnetic signal 126.

In some examples, the power source 528 can be electrically coupled to the upper section 118, the intermediary section 428, the lower section 120, or any combination of these via electronics 526 (e.g., electronics 430 of FIG. 4). The electronics 526 can include an amplifier, a tube, a resistor, a capacitor, an inductor, an integrated circuit (IC) component, a switch, a relay, a computing device (e.g., similar to computing device 128), a processor, a bus, a memory, or any combination of these. In some examples, the electronics 526 can operate the power source 528 to cause the power source 528 to transmit the modulated electrical signal to the upper section 118, the intermediary section 428, the lower section 120, or any combination of these. For example, the electronics 526 can include a computing device. The computing device can determine data to transmit uphole and operate the power source 528 in a manner configured to cause the power source 528 to transmit a modulated electrical signal encoded with the data to the upper section 118 and the lower section 120. This can cause the downhole transceiver 130 to generate an electromagnetic signal 126 encoded with the data that can propagate uphole.

In some examples, the uphole transceiver 502 can include the computing device 128. The computing device 128 can include a processor 504, a memory 508, and a bus 506. The processor 504 can execute one or more operations for determining a resistivity of a subterranean formation. The processor 504 can execute instructions stored in the memory 508 to perform the operations. The processor 504 can include one processing device or multiple processing devices. Non-limiting examples of the processor 504 include a Field-Programmable Gate Array ("FPGA"), an application-specific integrated circuit ("ASIC"), a microprocessor, etc.

The processor 504 can be communicatively coupled to the memory 508 via the bus 506. The non-volatile memory 508 may include any type of memory device that retains stored information when powered off. Non-limiting examples of the memory 508 include electrically erasable and programmable read-only memory ("EEPROM"), flash memory, or any other type of non-volatile memory. In some examples, at least some of the memory 508 can include a medium from which the processor 504 can read instructions. A computer-readable medium can include electronic, optical, magnetic, or other storage devices capable of providing the processor 504 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 508 can include one or more equations 510. The equations 510 can be usable for determining a resistivity of a subterranean formation. Examples of the equations 510 can include any of the equations described with respect to FIG. 1. For example, the equations 510 can include Equations 1 and 2 described with respect to FIG. 1.

In some examples, the memory 508 can include one or more values 514. The values 514 may be preprogrammed into memory 508 or acquired using one or more sensors (e.g., positionable in a wellbore). The values 514 can be usable with the equations 510 to determine a resistivity of a subterranean formation. For example, the values 514 can include values for $L_a$, D, f, $\mu_0$, $\mu_r$, or any combination of these (e.g., as discussed with respect to FIG. 1).

In some examples, the memory 508 can include a correction database 512. The correction database 512 can include one or more wellbore or well tool features correlated with a particular correction factor for correcting a determined resistivity. For example, the correction database 512 can include a particular fluid type correlated to a particular correction factor.

The uphole transceiver 502 can include a power source 520. The power source 520 can be in electrical communication with the computing device 128 and a communications device 522. In some examples, the power source 520 can include a battery or an electrical cable (e.g., a wireline).

In some examples, the power source 520 can include an AC signal generator. The computing device 128 can operate the power source 520 to apply a transmission signal to a communications device 522. For example, the computing device 128 can cause the power source 520 to apply a voltage with a frequency within a specific frequency range to the antenna 524. This can cause the antenna 524 to generate a wireless communication (e.g., an electromagnetic signal for communication data to the downhole transceiver 130). In other examples, the computing device 128, rather than the power source 520, can apply the transmission signal to the communications device 522 for generating the wireless communication.

The communications device 522 can detect communications from, and transmit communications to, the downhole transceiver 130. In some examples, the communications device 522 can include or can be coupled to a wired or wireless interface for communicating with the downhole transceiver 130. For example, the communications device 522 can include an antenna 524 or a wire coupled to a well tool (e.g., the well tool 114 of FIG. 1). In some examples, part of the communications device 522 can be implemented in software. For example, the communications device 522 can include instructions stored in memory 508. In some examples, the communications device 522 can include hardware or software configured to allow the communications device 522 to receive signals from the downhole transceiver 130 and amplify, filter, modulate, de-modulate, frequency shift, and otherwise manipulate the signals. The communications device 522 can transmit the manipulated signals to the processor 504 for further processing (e.g. for determining a resistivity of a subterranean formation).

Figure 6:
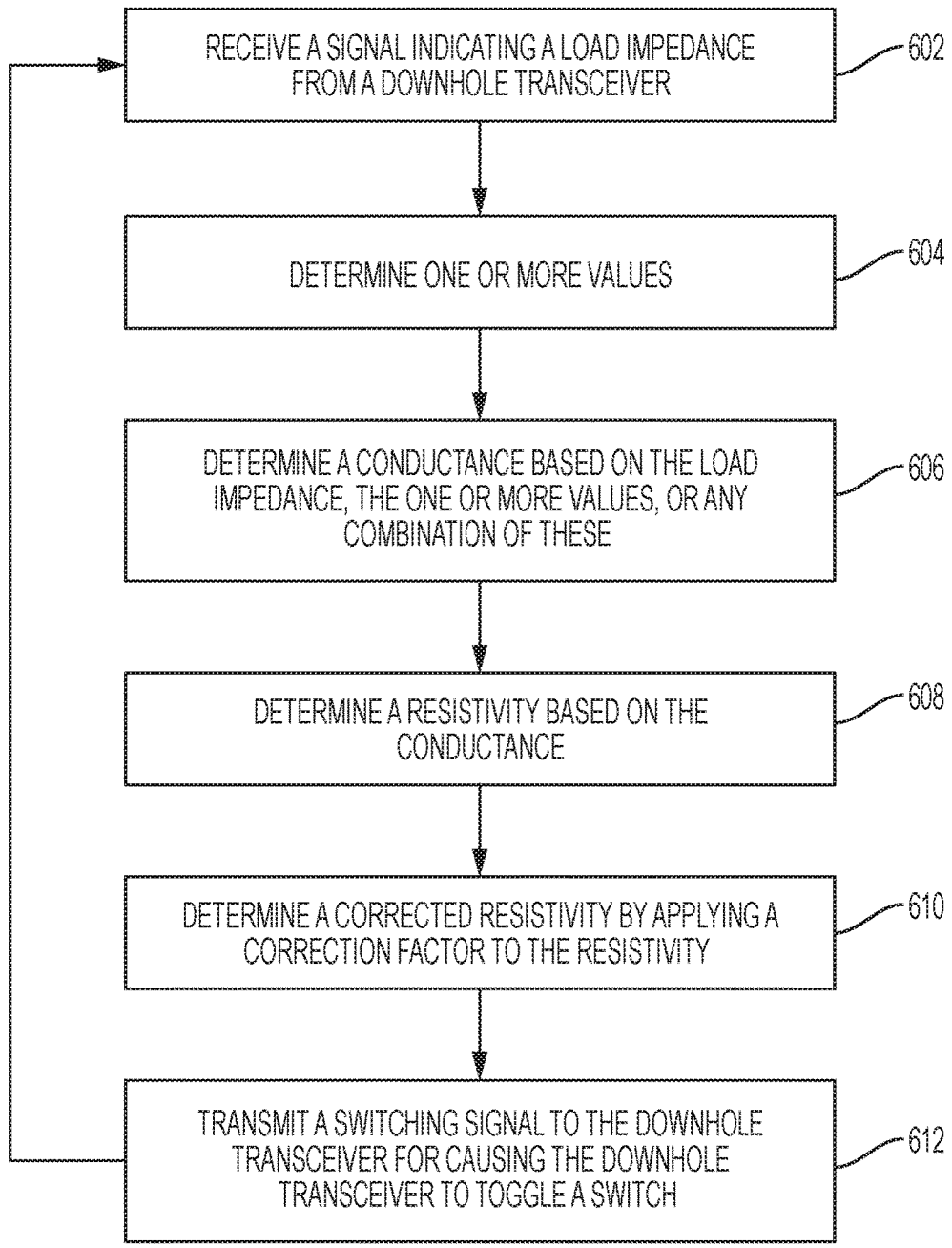
FIG. 6 is a flow chart showing an example of a process for determining subterranean-formation resistivity using an electromagnetic telemetry system according to one example.

FIG. 6 is a flow chart showing an example of a process for determining subterranean-formation resistivity using an electromagnetic telemetry system according to one example. Some examples can include more, fewer, or different blocks than those shown in FIG. 6. The blocks shown in FIG. 6 can be implemented using, for example, the computing devices 128 shown in FIG. 1.

In block 602, the computing device receives a signal (e.g., an electromagnetic signal) indicating a load impedance from a downhole transceiver. The downhole transceiver can be defined by multiple portions of a well tool positioned in a wellbore formed through a subterranean formation. The load impedance can be across an electrically insulating segment included within the downhole transceiver.

In block 604, the computing device can determine one or more values. For example, the computing device can retrieve the values from memory (e.g., memory 508 of FIG. 5). The values can include a longitudinal length of at least a portion of the well tool, a skin depth of the subterranean formation, an outer diameter of the electrically insulating segment of the downhole transceiver, a frequency at which the downhole transceiver operates, a magnetic permeability of the subterranean formation, a relative permeability of the subterranean formation, or any combination of these.

In block 606, the computing device can determine a conductivity (e.g., associated with a portion of the wellbore) based on the impedance, the one or more values, or any combination of these. For example, the computing device can use one or more relationships between the impedance, the values, or both to determine the conductivity. In some examples, the computing device can input the impedance and the values into one or more equations stored in memory (e.g., equations 510 of FIG. 5) to determine the conductivity.

In block 608, the computing device determines a resistivity (e.g., associated with a portion of the wellbore) based on the conductivity. For example, the computing device can inverse the conductivity to determine the resistivity.

In block 610, the computing device determines a corrected resistivity by applying a correction factor to the resistivity (e.g., determined in block 608). For example, the computing device can access a database and select a correction factor from the database. The correction factor can be selected to correct for an effect of a presence of a fluid in the wellbore, a type of the fluid in the wellbore, or (a volume of the fluid in the wellbore, a temperature in the wellbore, or any combination of these on the resistivity. The computing device can add the correction factor to, or subtract the correction factor from, the resistivity to determine the corrected resistivity.

In block 612, the computing device transmits a switching signal to the downhole transceiver for causing the downhole transceiver to toggle a switch. The switching signal can cause the downhole transceiver to toggle the switch from an open position (e.g., associated with one load impedance) to a closed position (e.g., associated with another load impedance). Additionally or alternatively, the switching signal can cause the downhole transceiver to toggle the switch from the closed position to the open position.

In some examples, the computing device can return to block 602 and repeat one or more steps of FIG. 6 to, for example, determine another corrected resistivity associated with another load impedance. For example, the computing device can perform blocks 602-610 after the switch has been toggled from the open position to the closed position.

In some aspects, computing devices, systems, and methods for determining subterranean-formation resistivity using an electromagnetic telemetry system are provided according to one or more of the following examples:

Example #1

A method can include receiving, from a downhole transceiver positioned on a well tool in a wellbore and by a computing device, a signal indicating a load impedance across an electrically insulating segment of the downhole transceiver. The method can include determining, by the computing device, a resistivity associated with a portion of the wellbore based on the load impedance. The method can include determining, by the computing device, a corrected resistivity by modifying the resistivity associated with the portion of the wellbore using a correction factor.

Example #2

The method of Example #1 may feature determining the corrected resistivity by selecting the correction factor from a database. The correction factor can be selected to correct for an effect of (i) a presence of a fluid in the wellbore, (ii) a type of the fluid in the wellbore, (iii) a volume of the fluid in the wellbore on the determined resistivity, or any combination of these. The method can include determining the corrected resistivity by adding the correction factor to, or subtracting the correction factor from, the resistivity associated with the portion of the wellbore.

Example #3

The method of any of Examples #1-3 may feature determining the resistivity associated with the portion of the wellbore by determining a conductivity associated with the portion of the wellbore based on the load impedance, and determining the resistivity associated with the portion of the wellbore by inversing the conductivity.

Example #4

The method of Example #3 may feature determining the conductivity associated with the portion of the wellbore by determining one or more values. The value(s) can include a longitudinal length of at least a portion of the well tool, a skin depth of a subterranean formation through which the wellbore is formed, an outer diameter of the electrically insulating segment of the downhole transceiver, a frequency at which the downhole transceiver operates, a magnetic permeability of the subterranean formation, a relative permeability of the subterranean formation, or any combination of these. The method can include determining the conductivity associated with the portion of the wellbore based on the one or more values.

Example #5

The method of any of Examples #1-4 may feature the load impedance including a first load impedance, the resistivity including a first resistivity, and the corrected resistivity including a first corrected resistivity. The method can include transmitting a switching signal to the downhole transceiver configured to cause the downhole transceiver to toggle a switch from an open position associated with the first load impedance to a closed position associated with a second load impedance. The method can include receiving, from the downhole transceiver and by the computing device, another signal indicating the second load impedance. The method can include determining, by the computing device, a second resistivity associated with another portion of the wellbore based on the second load impedance. The method can include determining, by the computing device, a second corrected resistivity by modifying the second resistivity using another correction factor.

Example #6

The method of any of Examples #1-5 may feature the downhole transceiver generating the signal by applying a modulated voltage across a first electrically conductive housing and a second electrically conductive housing of the well tool. The electrically insulating segment can be positioned between the first electrically conductive housing and the second electrically conductive housing for electrically separating the first electrically conductive housing from the second electrically conductive housing.

Example #7

A system can include a well tool positionable in a wellbore. The well tool can include a downhole transceiver configured to transmit an electromagnetic signal indicative of a load impedance across an electrically insulating segment of the downhole transceiver. The system can also include a computing device. The computing device can be positioned to receive the electromagnetic signal from the downhole transceiver. The computing device can include memory in which instructions executable by a processor are stored. The instructions can cause the processor to determine a resistivity associated with a portion of the wellbore based on the load impedance, and determine a corrected resistivity by modifying the resistivity associated with the portion of the wellbore using a correction factor.

Example #8

The system of Example #7 may feature the downhole transceiver including a first electrically conductive housing of the well tool. The downhole transceiver can also include a second electrically conductive housing of the well tool. The downhole transceiver can also include the electrically insulating segment positioned between the first electrically conductive housing and the second electrically conductive housing for electrically separating the first electrically conductive housing from the second electrically conductive housing.

Example #9

The system of any of Examples #7-8 may feature the downhole transceiver being configured to generate the electromagnetic signal by applying a modulated voltage across a first electrically conductive housing and a second electrically conductive housing.

Example #10

The system of any of Examples #7-9 may feature the portion of the wellbore being a section of a subterranean formation through which the wellbore is formed, the section being adjacent to a second electrically conductive housing of the downhole transceiver.

Example #11

The system of any of Examples #7-10 may feature the memory further including instructions executable by the processor for causing the processor to determine the corrected resistivity by selecting the correction factor from a database. The correction factor can be selected to correct for an effect of (i) a presence of a fluid in the wellbore, (ii) a type of the fluid in the wellbore, (iii) a volume of the fluid in the wellbore on the determined resistivity, or any combination of these. The memory can also include instructions executable by the processor for causing the processor to determine the corrected resistivity by adding the correction factor to, or subtracting the correction factor from, the resistivity associated with the portion of the wellbore.

Example #12

The system of any of Examples #7-11 may feature the memory further including instructions executable by the processor for causing the processor to determine the resistivity associated with the portion of the wellbore by determining a conductivity associated with the portion of the wellbore based on the load impedance, and determining the resistivity associated with the portion of the wellbore by inversing the conductivity.

Example #13

The system of any of Examples #7-12 may feature the memory further including instructions executable by the processor for causing the processor to determine a conductivity associated with the portion of the wellbore based on a longitudinal length of a second electrically conductive housing of the well tool, a skin depth of a subterranean formation, an outer diameter of the electrically insulating segment, a frequency at which the downhole transceiver operates, a magnetic permeability of the subterranean formation, a relative permeability of the subterranean formation, or any combination of these.

Example #14

The system of any of Examples #7-13 may feature the downhole transceiver further including an intermediary electrically conductive housing of the drill string positioned longitudinally between a first electrically conductive housing and a second electrically conductive housing of the well tool. The electrically insulating segment can be positioned between the first electrically conductive housing and the intermediary electrically conductive housing. The downhole transceiver can further include another electrically insulating segment positioned between the intermediary electrically conductive housing and the second electrically conductive housing.

Example #15

The system of Example #14 may feature the downhole transceiver further including a switch that is toggleable between (i) a closed position configured to electrically couple the intermediary electrically conductive housing to the second electrically conductive housing; and (ii) an open position configured to electrically decouple the intermediary electrically conductive housing from the second electrically conductive housing. The load impedance can include one load impedance when the switch is in the closed position and another load impedance when the switch is in the open position.

Example #16

A computing device can include a processor and memory in which instructions executable by the processor are stored. The instructions can cause the processor to receive, from a downhole transceiver positionable on a well tool in a wellbore, a signal indicating a load impedance across an electrically insulating segment of the downhole transceiver. The instructions can cause the processor to determine a resistivity associated with a portion of the wellbore based on the load impedance. The instructions can cause the processor to determine a corrected resistivity by modifying the resistivity associated with the portion of the wellbore using a correction factor.

Example #17

The computing device of Example #16 may feature the memory device further including instructions executable by the processing device for causing the processing device to determine the corrected resistivity by selecting the correction factor from a database. The correction factor can be selected to correct for an effect of (i) a presence of a fluid in the wellbore, (ii) a type of the fluid in the wellbore, (iii) a volume of the fluid in the wellbore on the determined resistivity, or any combination of these. The memory device can further include instructions executable by the processing device for causing the processing device to determine the corrected resistivity by determining the corrected resistivity by adding the correction factor to, or subtracting the correction factor from, the resistivity associated with the portion of the wellbore.

Example #18

The computing device of any of Examples #16-17 may feature the memory device further including instructions executable by the processing device for causing the processing device to determine the resistivity associated with the portion of the wellbore by determining a conductivity associated with the portion of the wellbore based on the load impedance, and determining the resistivity associated with the portion of the wellbore by inversing the conductivity.

Example #19

The computing device of any of Examples #16-18 may feature the well tool including a drill string for drilling the wellbore from a subterranean formation. The downhole transceiver can include a first electrically conductive housing of the drill string. The downhole transceiver can include a second electrically conductive housing of the drill string. The downhole transceiver can include an electrically insulating segment positioned between the first electrically conductive housing and the second electrically conductive housing for electrically separating the first electrically conductive housing from the second electrically conductive housing.

Example #20

The computing device of any of Examples #16-19 may feature the portion of the wellbore being a section of a subterranean formation that is adjacent to a second electrically conductive housing of the well tool.

Example #21

The computing device of any of Examples #16-20 may feature the memory device further including instructions executable by the processing device for causing the processing device to determine a conductivity associated with the portion of the wellbore based on a longitudinal length of a second electrically conductive housing of the well tool, a skin depth of a subterranean formation, an outer diameter of the electrically insulating segment, a frequency at which the downhole transceiver operates, a magnetic permeability of the subterranean formation, a relative permeability of the subterranean formation, or any combination of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    receiving, from a downhole transceiver positioned on a well tool in a wellbore and by a computing device, a signal indicating a load impedance across an electrically insulating segment of the downhole transceiver;
    determining, by the computing device, a conductivity associated with a portion of the wellbore based on the load impedance and a plurality of values, wherein the plurality of values comprises a longitudinal length of at least a portion of the well tool, a skin depth of a subterranean formation through which the wellbore is formed, an outer diameter of the electrically insulating segment of the downhole transceiver, a frequency at which the downhole transceiver operates, a magnetic permeability of the subterranean formation, and a relative permeability of the subterranean formation;
    determining, by the computing device, a resistivity associated with the portion of the wellbore by inversing the conductivity; and
    determining, by the computing device, a corrected resistivity by modifying the resistivity associated with the portion of the wellbore using a correction factor.

2. The method of claim 1, wherein determining the corrected resistivity comprises:
    selecting the correction factor from a database, wherein the correction factor is selected to correct for an effect of (i) a presence of a fluid in the wellbore, (ii) a type of the fluid in the wellbore, or (iii) a volume of the fluid in the wellbore on the determined resistivity; and
    determining the corrected resistivity by adding the correction factor to, or subtracting the correction factor from, the resistivity associated with the portion of the wellbore.

3. The method of claim 1, wherein the load impedance comprises a first load impedance, the resistivity comprises a first resistivity, and the corrected resistivity comprises a first corrected resistivity, and further comprising:
    transmitting a switching signal to the downhole transceiver configured to cause the downhole transceiver to toggle a switch from an open position associated with the first load impedance to a closed position associated with a second load impedance;
    receiving, from the downhole transceiver and by the computing device, another signal indicating the second load impedance;
    determining, by the computing device, a second resistivity associated with another portion of the wellbore based on the second load impedance; and
    determining, by the computing device, a second corrected resistivity by modifying the second resistivity using another correction factor.

4. The method of claim 1, wherein the downhole transceiver generates the signal by applying a modulated voltage across a first electrically conductive housing and a second electrically conductive housing of the well tool, and
wherein the electrically insulating segment is positioned between the first electrically conductive housing and the second electrically conductive housing for electrically separating the first electrically conductive housing from the second electrically conductive housing.

5. A system comprising:
a well tool positionable in a wellbore and comprising a downhole transceiver configured to transmit an electromagnetic signal indicative of a load impedance across an electrically insulating segment of the downhole transceiver; and
a computing device positioned to receive the electromagnetic signal from the downhole transceiver, the computing device comprising memory in which instructions executable by a processor are stored for causing the processor to:
determine a conductivity associated with a portion of the wellbore based on the load impedance and a plurality of values, wherein the plurality of values comprises a longitudinal length of at least a portion of the well tool, a skin depth of a subterranean formation through which the wellbore is formed, an outer diameter of the electrically insulating segment of the downhole transceiver, a frequency at which the downhole transceiver operates, a magnetic permeability of the subterranean formation, and a relative permeability of the subterranean formation;
determine a resistivity associated with the portion of the wellbore by inversing the conductivity; and
determine a corrected resistivity by modifying the resistivity associated with the portion of the wellbore using a correction factor.

6. The system of claim 5, wherein the downhole transceiver comprises:
a first electrically conductive housing of the well tool;
a second electrically conductive housing of the well tool; and
the electrically insulating segment positioned between the first electrically conductive housing and the second electrically conductive housing for electrically separating the first electrically conductive housing from the second electrically conductive housing.

7. The system of claim 6, wherein the downhole transceiver is configured to generate the electromagnetic signal by applying a modulated voltage across the first electrically conductive housing and the second electrically conductive housing.

8. The system of claim 6, wherein the portion of the wellbore is a section of the subterranean formation through which the wellbore is formed that is adjacent to the second electrically conductive housing.

9. The system of claim 8, wherein the memory further comprises instructions executable by the processor for causing the processor to determine the corrected resistivity by:
selecting the correction factor from a database, the correction factor selected to correct for an effect of (i) a presence of a fluid in the wellbore, (ii) a type of the fluid in the wellbore, or (iii) a volume of the fluid in the wellbore on the determined resistivity; and
determining the corrected resistivity by adding the correction factor to, or subtracting the correction factor from, the resistivity associated with the portion of the wellbore.

10. The system of claim 6, wherein the downhole transceiver further comprises:
an intermediary electrically conductive housing of the well tool positioned longitudinally between the first electrically conductive housing and the second electrically conductive housing;
wherein the electrically insulating segment is positioned between the first electrically conductive housing and the intermediary electrically conductive housing, and wherein the downhole transceiver further comprises another electrically insulating segment positioned between the intermediary electrically conductive housing and the second electrically conductive housing.

11. The system of claim 10, wherein the downhole transceiver further comprises a switch toggleable between (i) a closed position configured to electrically couple the intermediary electrically conductive housing to the second electrically conductive housing; and (ii) an open position configured to electrically decouple the intermediary electrically conductive housing from the second electrically conductive housing; and
wherein the load impedance comprises one load impedance when the switch is in the closed position and another load impedance when the switch is in the open position.

12. A computing device comprising:
a processor; and
a memory in which instructions executable by the processor are stored for causing the processor to:
receive, from a downhole transceiver positionable on a well tool in a wellbore, a signal indicating a load impedance across an electrically insulating segment of the downhole transceiver;
determine a conductivity associated with a portion of the wellbore based on the load impedance and a plurality of values, wherein the plurality of values comprises a longitudinal length of at least a portion of the well tool, a skin depth of a subterranean formation through which the wellbore is formed, an outer diameter of the electrically insulating segment of the downhole transceiver, a frequency at which the downhole transceiver operates, a magnetic permeability of the subterranean formation, and a relative permeability of the subterranean formation;
determine a resistivity associated with the portion of the wellbore by inversing the conductivity; and
determine a corrected resistivity by modifying the resistivity associated with the portion of the wellbore using a correction factor.

13. The computing device of claim 12, wherein the memory further comprises instructions executable by the processor for causing the processor to determine the corrected resistivity by:
selecting the correction factor from a database, the correction factor selected to correct for an effect of (i) a presence of a fluid in the wellbore, (ii) a type of the fluid in the wellbore, or (iii) a volume of the fluid in the wellbore on the determined resistivity; and
determining the corrected resistivity by adding the correction factor to, or subtracting the correction factor from, the resistivity associated with the portion of the wellbore.

14. The computing device of claim 12, wherein the well tool comprises a drill string for drilling the wellbore from a subterranean formation, and wherein the downhole transceiver comprises:
a first electrically conductive housing of the drill string;
a second electrically conductive housing of the drill string; and the electrically insulating segment positioned between the first electrically conductive housing and the second electrically conductive housing for electrically separating the first electrically conductive housing from the second electrically conductive housing.

15. The computing device of claim 14, wherein the portion of the wellbore is a section of the subterranean formation that is adjacent to the second electrically conductive housing.

\* \* \* \* \*